(12) United States Patent
Meggiolan

(10) Patent No.: US 6,722,743 B2
(45) Date of Patent: Apr. 20, 2004

(54) SPOKED WHEEL FOR A BICYCLE AND METHOD FOR ITS MANUFACTURE

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 10/216,259

(22) Filed: Aug. 9, 2002

(65) Prior Publication Data

US 2003/0038530 A1 Feb. 27, 2003

(30) Foreign Application Priority Data

Aug. 9, 2001 (IT) ..................... TO2001A0806

(51) Int. Cl.$^7$ ................................. B60B 1/02
(52) U.S. Cl. ....................... 301/55; 301/56; 301/60
(58) Field of Search ................. 301/55 I, 56, 58, 301/59, 60, 104; 29/894.33, 894.332, 894.333

(56) References Cited

U.S. PATENT DOCUMENTS

| | | | | | |
|---|---|---|---|---|---|
| 574,538 | A | * | 1/1897 | Hammon | 301/56 |
| 1,153,919 | A | * | 9/1915 | Hopkins | 301/60 |
| 1,634,700 | A | * | 7/1927 | Williams | 29/894.342 |
| 1,653,612 | A | * | 12/1927 | Baker | 301/55 |
| 1,933,178 | A | * | 10/1933 | Le Jeune | 301/55 |
| 4,090,737 | A | * | 5/1978 | Jensen | 301/59 |
| 5,938,293 | A | * | 8/1999 | Dietrich | 301/59 |
| 6,145,938 | A | * | 11/2000 | Dietrich | 301/59 |
| 6,443,532 | B1 | * | 9/2002 | Cheng | 301/55 |

* cited by examiner

Primary Examiner—S. Joseph Morano
Assistant Examiner—Jason R. Bellinger
(74) Attorney, Agent, or Firm—Volpe and Koenig, P.C.

(57) ABSTRACT

A spoked wheel comprised of a hub and a rim connected by first and second sets of spokes, each set having a plurality of radial spokes and a plurality of non-radial spokes.

16 Claims, 6 Drawing Sheets

SPOKED WHEEL FOR A BICYCLE AND METHOD FOR ITS MANUFACTURE

FIELD OF INVENTION

The present invention relates generally to the field of spoked wheels and specifically to the spoking pattern or arrangement of the spokes that connect the hub to the rim.

BACKGROUND

Customarily, the most inexpensive wheels (having a number of spokes that may be as high as 36) are assembled with spokes that are non-radial, and therefore cross over each other, on both sides of the wheel. The wheels used in competition are characterized by a smaller number of spokes (which may be as low as 16 or fewer) and are generally assembled with radial spokes on both sides of the wheel in the case of front wheels, while on the rear wheel the spokes on one side may be radial and those on the other side may be non-radial and crossed.

This type of configuration leads to aesthetic results that have now become established and repetitive. In commercial terms, it would be desirable to have spoking patterns available that are more original from the aesthetic standpoint and make it possible to distinguish the product from the many very similar wheels available on the market.

Apart from this requirement of differentiation from the aesthetic standpoint, it is also necessary to simplify the operations of assembling the wheels, this is particularly true in the case of high-quality wheels in which assembly takes place manually. In this case, specifically, it would be desirable to make use of an assembly sequence that facilitates the centring operations and reduces the assembly time.

A further requirement is to make the transmission of forces between the hub and the rim via the spokes more consistent and efficient.

SUMMARY

A spoke wheel having a hub and a rim connected together by a plurality of spokes. The wheel comprises an elongate hub having spaced apart first and second securing portions that define a plurality of spoke receiving apertures which are spaced circumferentially about a central axis through the hub; a rim having an equal plurality of spoke receiving apertures define therein; and an equal plurality of spokes divided into first and second sets of spokes wherein the spokes of the first set are connected between the first securing portion and the rim and the spokes of the second set are connected between the second securing portion and the rim, and both the first and the second sets of spokes include spokes that are oriented radially with respect to the central axis through the hub and spokes that are oriented non-radially with respect to the central axis through the hub.

BRIEF DESCRIPTION OF THE DRAWING(S)

Further features and advantages of the invention will become apparent from the description that follows, with reference to the attached drawings, which are provided purely by way of example and without implying any limitation, and in which.

DETAILED DESCRIPTION OF THE PREFERRED EMBODIMENT(S)

Figure 1:
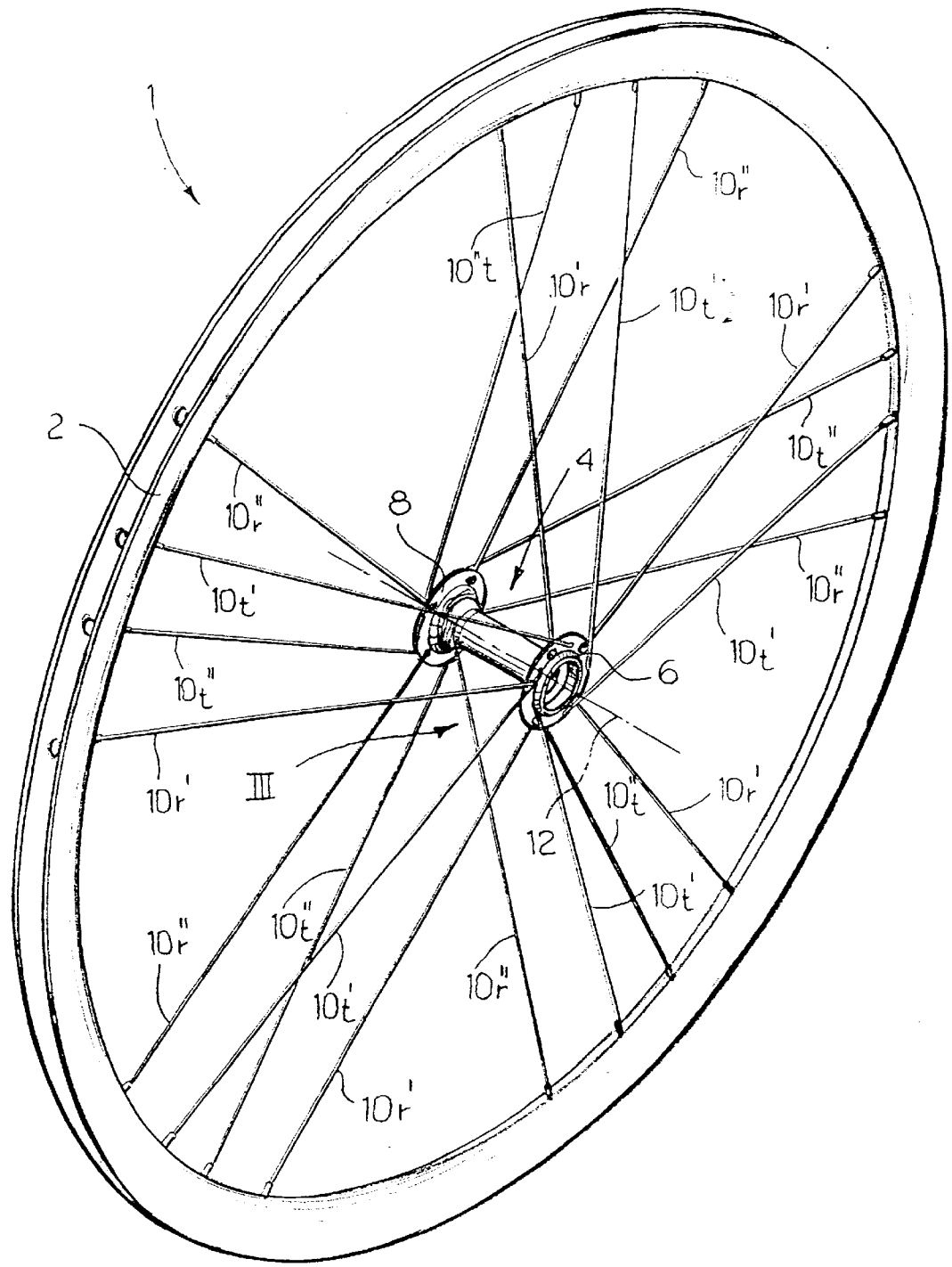
FIG. 1 is a perspective view of a wheel according to the present invention.

In the figures, the numeral 1 designates as a whole a spoked bicycle wheel comprising a rim 2 connected to a hub 4 by means of a plurality of spokes 10 having outer ends secured to the rim 2 and inner ends secured to the hub 4.

The hub 4 comprises a first and a second portion for securing the spokes, designated respectively 6 and 8. The spokes having their inner ends secured to the first portion 6 are designated 10' and the spokes having their inner ends secured to the second portion 8 are designated 10". For the sake of simplicity, in the remainder of the description and claims the spokes 10' will be referred to as spokes of the first set and the spokes 10" will be referred to as spokes of the second set. In turn, the spokes of the first and of the second set 10', 10" are subdivided into radial spokes and non-radial spokes. The radial spokes sets are identified by the subscript "r" and the non-radial spokes by the subscript "t". For the purposes of the present description and of the claims that follow, the definition of the terms "radial" and "non-radial" is given with reference to the axis of rotation 12 of the hub 4: the definition "radial" is given to a spoke 10 contained in a plane passing through the axis 12 of the hub 4, and the definition "non-radial" is given to a spoke 10 that is not contained in a plane passing through the axis 12.

The first and the second set of spokes 10' and 10" each comprise a plurality of radial spokes $10'_r$, $10''_r$ and a plurality of non-radial spokes $10'_t$, $10''_t$. On each side of the wheel, the radial and non-radial spokes are grouped in pairs which are mutually equidistant in the circumferential direction around the first portion 6 or second portion 8.

Each pair formed by a radial spoke $10'_r$ and a non-radial spoke $10'_t$ of the first set secured to portion 6 is associated with a corresponding pair formed by a radial spoke $10''_r$ and a non-radial spoke $10''_t$ of the second set secured to portion 8, so that the wheel 1 assumes the form of a wheel having radial members that are mutually equidistant, wherein each associated pairing comprises a radial spoke and a non-radial spoke of the first set and a radial spoke and a non-radial spoke of the second set.

Figure 2:
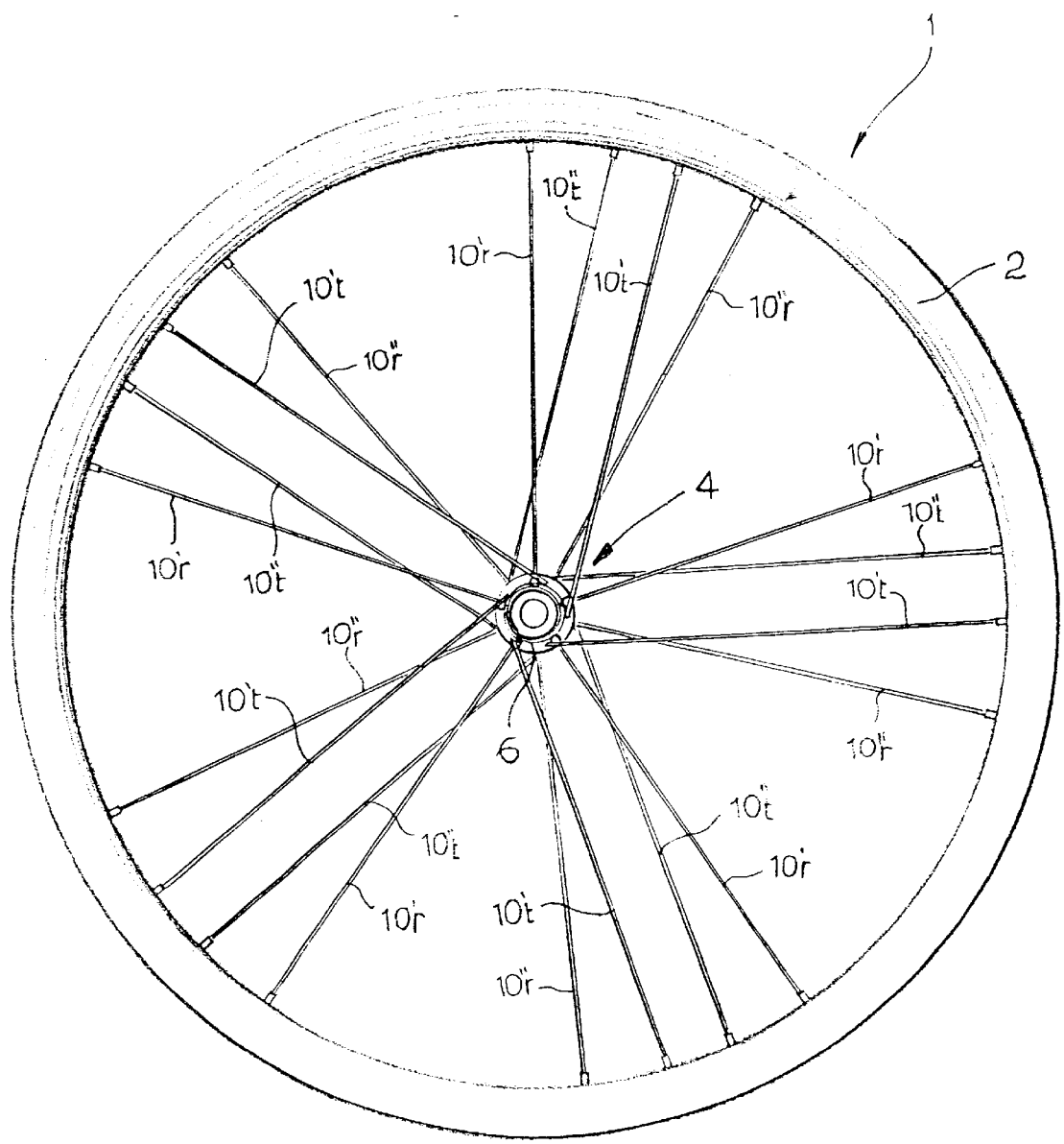
FIG. 2 is a plan view of the wheel according to FIG. 1.
Figure 3:
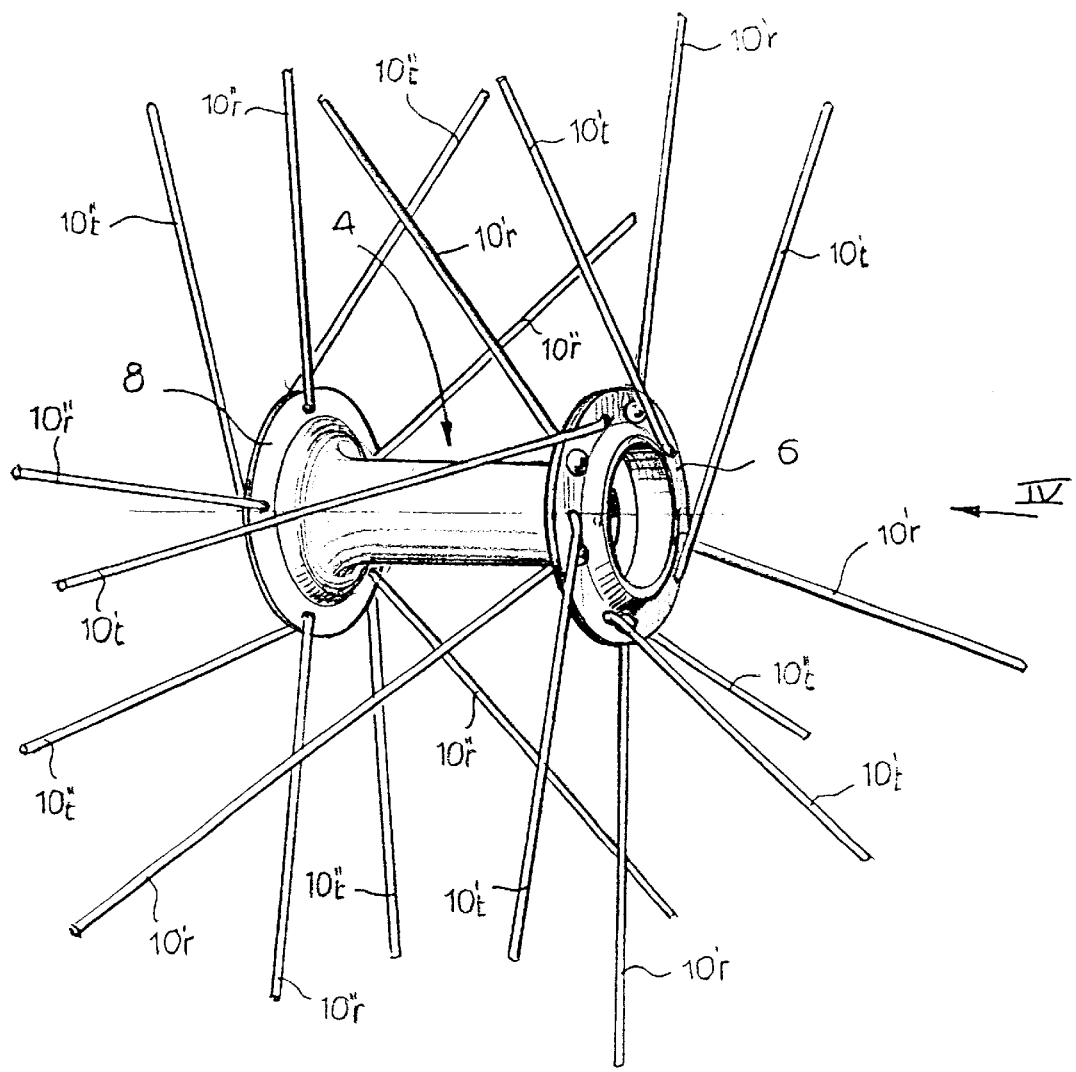
FIG. 3 is an enlarged view of the detail indicated by the arrow III in FIG. 1.
Figure 4:
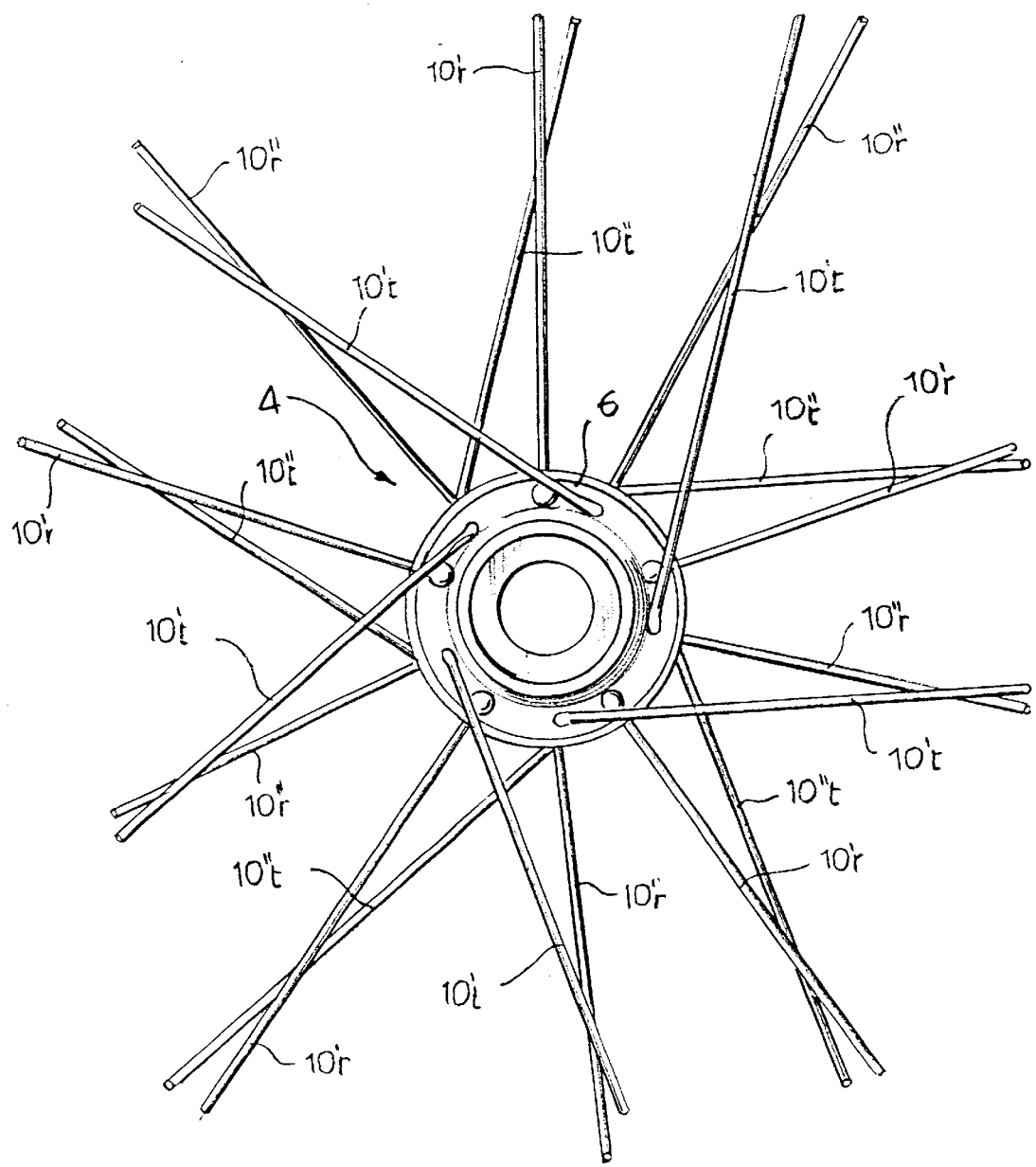
FIG. 4 shows a plan view of the detail indicated by the arrow IV in FIG. 3.
Figure 6:
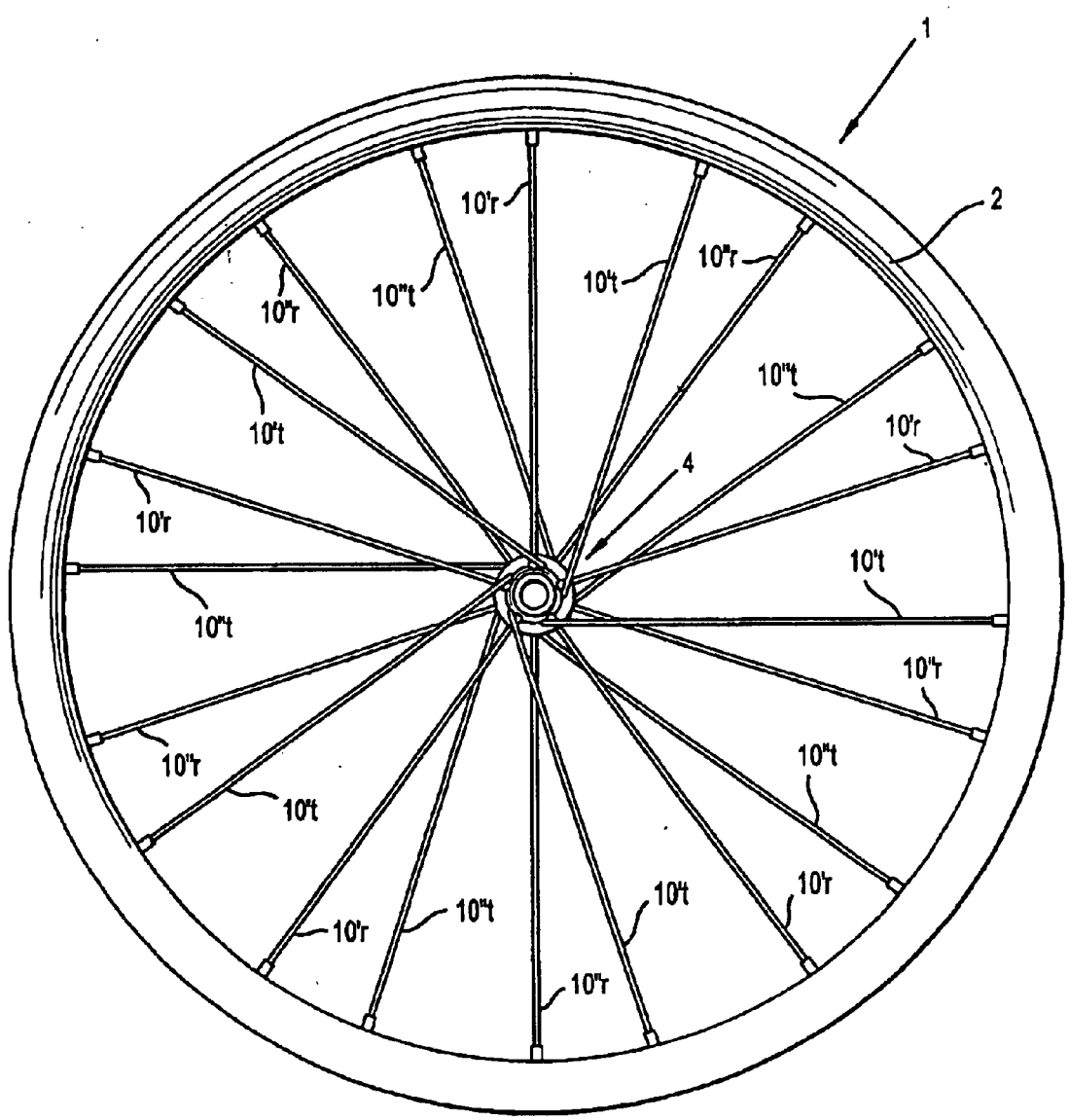
FIG. 6 is a perspective view of the wheel hub according to one embodiment of the present invention.

The non-radial spokes are oriented in two different ways. Referring to FIGS. 2 and 3, the non-radial spokes of the first set $10'_t$ are oriented in a direction that we may define as "counter-clockwise" relative to the axis of rotation of the hub while the non-radial spokes of the second set $10''_t$ are oriented in the opposite direction, that is to say in a direction that we may define as "clockwise" relative to the axis of rotation of the hub. FIG. 6, in contrast, shows both sets of non-radial spokes oriented in a counter-clockwise direction. The non-radial spokes of the first and of the second set $10'_t$ and $10''_t$ are equal in number and are equally subdivided between the two orientations.

In the illustrated embodiment, the wheel 1 has a total of twenty (20) spokes. On each side of the wheel are provided five radial spokes and five non-radial spokes. The number of spokes may however be varied as a function of the wheel's requirements. The non-radial spokes of the two sides of the wheel have mutually opposite orientations in order to balance the tangential forces acting on the rim 2 and on the hub 4 as a result of the tensioning of the spokes.

Figure 5:
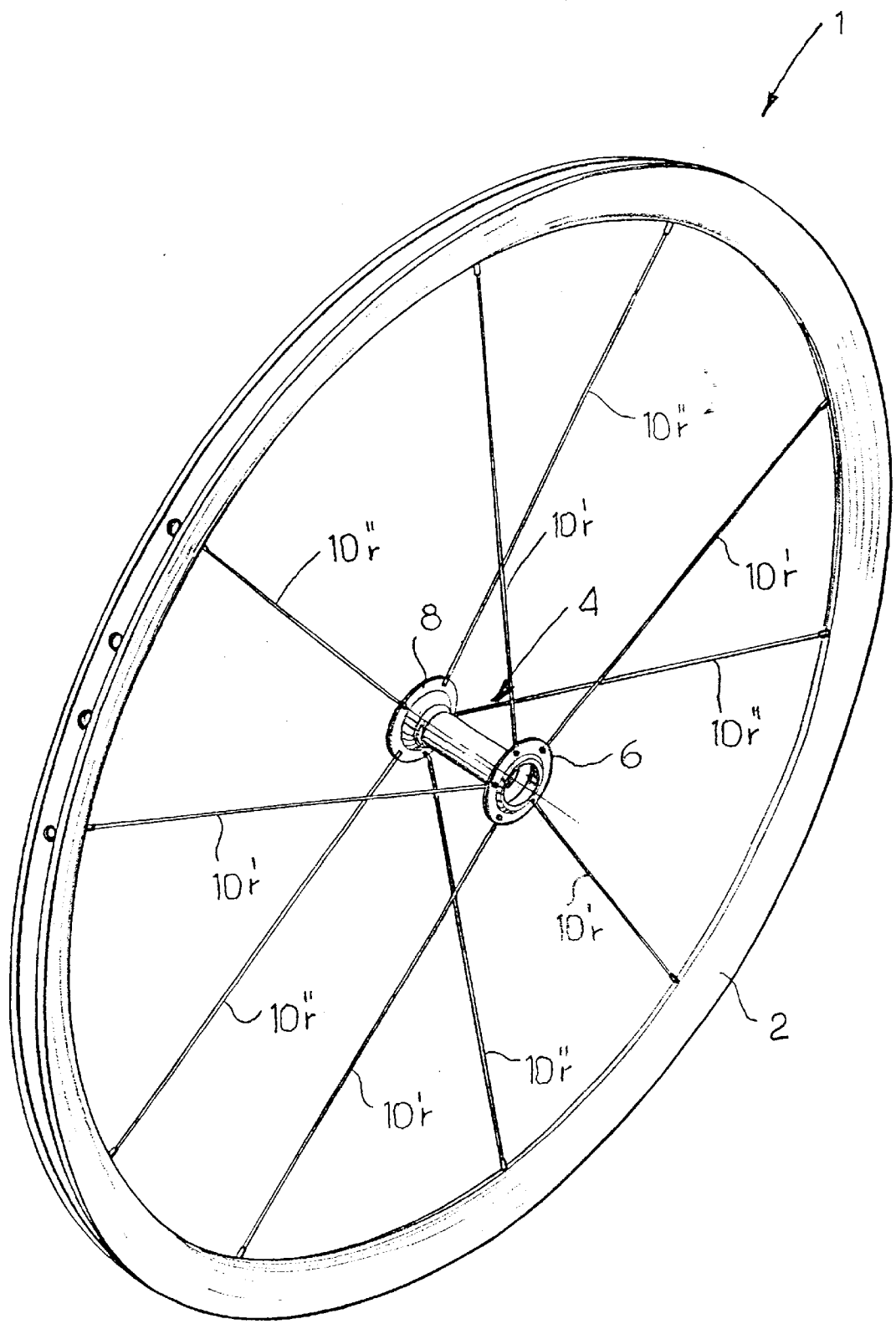
FIG. 5 is a perspective view illustrating an intermediate phase of the assembly sequence of a wheel according to FIG. 1.

The sequence for assembling a wheel according to the present invention has the following operational phases:

assembling the radial spokes 10'$_r$ and 10"$_r$ alone and preliminary centring of the wheel (this phase is illustrated in FIG. 5), assembling and progressive tensioning of the non-radial spokes 10'$_t$ and 10"$_t$, and final tensioning and centring of the wheel.

This assembly procedure is especially advantageous in cases where the assembly of the spokes takes place manually. The main advantage lies in the fact that by the end of the first phase the wheel is already assembled and stabilized and can be easily manipulated in the subsequent phase. In particular, it is unnecessary for the operator to assemble the non-radial spokes on a unit that is not yet stable. The two sets of non-radial spokes in mutual opposition stabilize the wheel from the torsional standpoint and apply a torsional preloading to the hub 4. This induces a state of torsional stress and a rotational deformation of the body of the hub owing to the tensioning of the spokes. This effect allows the recovery of the detensioning of the spokes via the elastic energy stored in the body of the hub, which reduces the risk of loosening of the spokes.

The wheel according to the present invention may be used either as a front wheel or as a rear wheel. In the case where the invention is applied to a rear wheel or to a front wheel having a disc brake, the spokes 10' and 10" will have different inclinations relative to the median plane of the wheel because of the size, in the direction of the axis of the hub, of the gear set or of the brake disc. A different inclination of the two sets of spokes calls for greater tensioning of the spokes of lesser inclination, for the purpose of balancing the forces applied to the rim by the spokes of the opposite side. The fact of having two mutually dissociated sets of non-radial spokes makes it possible to reduce the fatigue stress on the more highly tensioned spokes. Specifically, for the purpose of limiting the fatigue stresses on the more highly tensioned spokes, the wheel may be assembled so that the said spokes, as a result of the torque transmission caused by pedalling or by the braking action on the disc, are detensioned relative to the assembly tension, while the spokes under lower static tension increase their tension relative to the nominal assembly value as a result of the torque transmission. In this way, the spokes that are more highly tensioned at the time of assembly, and potentially more subject to the risk of breaking, are working under reduction of load, and thus under less critical conditions from the point of view of fatigue stress, while the spokes that are less highly tensioned at the time of assembly, and therefore less subject to the risk of breaking, are working under increase of load, and thus under more critical conditions from the point of view of fatigue stress. In this way, the loading conditions arising overall are more even between the spokes of the first and of the second set.

Of course, without departing from the principle of the invention, details of design and forms of embodiment may vary extensively by comparison with what has been described and illustrated purely by way of example, without thereby departing from the scope of the present invention.

What is claimed is:

1. A spoked bicycle wheel comprising:
   a hub;
   a rim; and
   a plurality of spokes that connect the hub and the rim;

wherein the hub has a first and a second securing portion for the spokes, mutually spaced in the direction of the longitudinal axis of the hub;

wherein the spokes of a first set have their inner ends secured to the first securing portion and the spokes of a second set have their inner ends secured to the second securing portion;

wherein the spokes of the first set and the second set do not cross over each other when the wheel is viewed perpendicularly to a plane through the longitudinal axis of the hub; and wherein the first and the second set of spokes each comprise a plurality of radial spokes and a plurality of non-radial spokes.

2. The wheel of claim 1, wherein the spokes of each set are subdivided into equidistant pairs, each pair comprising a radial spoke and a non-radial spoke.

3. The wheel of claim 1, wherein at least one spoke in each of the first and second sets is non radial and the non-radial spokes of the first set have an opposite orientation to the non-radial spokes of the second set.

4. The wheel of claim 2, wherein the non-radial spokes of each set have the same orientation.

5. The wheel of claim 3, wherein the non-radial spokes of the first set are in a number equal to that of the non-radial spokes of the second set.

6. The wheel of claim 1, wherein the spokes are grouped to form an equidistantly spaced spoke set, each spoke set comprising a radial spoke of the first set, a non-radial spoke of the first set, a radial spoke of the second set (10"$_r$) and a non-radial spoke of the second set.

7. The wheel of claim 1, wherein the points of attachment on the rim of the spokes of each radial member are mutually equidistant around the circumference of the rim.

8. A method for the assembly of a wheel for a bicycle, comprising the steps:

assembling a plurality of spokes that connect the hub and the rim wherein when the wheel is viewed through a cross-section through the longitudinal axis of the hub, the spokes do not each other, wherein at least one spoke is radial and one spoke is non-radial, undertaking preliminary centering of the wheel comprising radial spokes only, assembling and tensioning a plurality of non-radial spokes between the rim and the hub, and undertaking final tensioning of the spokes in order to achieve final centering of the wheel.

9. A spoke wheel having a hub and a rim connected together by a plurality of spokes, the wheel comprising:

an elongate hub having spaced apart first and second securing portions that define a plurality of spoke receiving apertures which are spaced circumferentially about a central axis through the hub;

a rim having a plurality of spoke receiving apertures defined therein; and a plurality of spokes divided into first and second sets of spokes wherein the spokes of the first set are connected between the first securing portion and the rim and the spokes of the second set are connected between the second securing portion and the rim, and both the first and the second sets of spokes include spokes that are oriented radially with respect to the central axis through the hub and spokes that are oriented non-radially with respect to the central axis through the hub;

wherein when the wheel is viewed through a cross-section through the longitudinal axis of the hub, the spokes of the first set do not cross each other and the spokes of second set do not cross each other.

10. The wheel of claim 9 wherein each radial spoke is associated with a respective non-radial spoke.

11. The wheel of claim 9 wherein the spokes of each set are subdivided into equidistant pairs, each pair comprising a radial spoke and a non-radial spoke.

12. The wheel of claim 9 wherein the non-radial spokes of the first set have an opposite orientation to the non-radial spokes of the second set.

13. The wheel of claim 9 wherein the radial spokes of each set have the same orientation.

14. The wheel of claim 13 wherein the non-radial spokes of the first set have an opposite orientation to the non-radial spokes of the second set.

15. The wheel of claim 9 wherein the plurality of spokes is equal in number to the plurality of spoke apertures in the hub.

16. The wheel of claim 1 wherein each spoke is connected to the rim at a point equidistant from either one of two edges of the rim.

* * * * *

UNITED STATES PATENT AND TRADEMARK OFFICE
CERTIFICATE OF CORRECTION

PATENT NO. : 6,722,743 B2
DATED : April 20, 2004
INVENTOR(S) : Mario Meggiolan

It is certified that error appears in the above-identified patent and that said Letters Patent is hereby corrected as shown below:

Column 1,
Line 34, delete "centring" and insert therefor -- centering --.

Column 3,
Line 6, after the word "preliminary", delete "centring" and insert therefor -- centering --.
Line 11, after the word "and", delete "centring" and insert therefor -- centering --.
Line 42, after the first instance of the word "by", delete "pedalling" and insert therefor -- pedaling --.

Column 4,
Line 40, after the word "not", insert -- cross --.

Signed and Sealed this

Seventeenth Day of August, 2004

JON W. DUDAS
*Acting Director of the United States Patent and Trademark Office*